United States Patent
Wetherell

(12) 
(10) Patent No.: US 10,428,228 B1
(45) Date of Patent: Oct. 1, 2019

(54) PRE-TREATMENT AND CLEANING OF EQUIPMENT USED WITH UNCURED CEMENTITIOUS MATERIALS

(71) Applicant: Arris Technologies, LLC, Heber City, UT (US)

(72) Inventor: Mark Wetherell, Henderson, NV (US)

(73) Assignee: Arris Technologies, LLC, Heber City, UT (US)

( * ) Notice: Subject to any disclaimer, the term of this patent is extended or adjusted under 35 U.S.C. 154(b) by 76 days.

(21) Appl. No.: 14/708,164

(22) Filed: May 8, 2015

Related U.S. Application Data

(63) Continuation-in-part of application No. 14/601,198, filed on Jan. 20, 2015.

(60) Provisional application No. 61/929,355, filed on Jan. 20, 2014, provisional application No. 61/990,526, filed on May 8, 2014.

(51) Int. Cl.
| | | |
|---|---|---|
| *B24B 1/00* | (2006.01) | |
| *C09D 7/61* | (2018.01) | |
| *B05D 1/02* | (2006.01) | |
| *B05B 1/00* | (2006.01) | |
| *B24C 11/00* | (2006.01) | |

(52) U.S. Cl.
CPC .............. *C09D 7/61* (2018.01); *B05B 1/00* (2013.01); *B05D 1/02* (2013.01); *B24C 11/00* (2013.01)

(58) Field of Classification Search
USPC .................................. 451/28, 32, 37, 38
See application file for complete search history.

(56) References Cited

U.S. PATENT DOCUMENTS

| | | | |
|---|---|---|---|
| 5,507,875 A | * 4/1996 | Hailey | B08B 7/02 134/1 |
| 6,418,948 B1 | * 7/2002 | Harmon | B01F 15/00032 134/167 R |
| 8,852,334 B1 | 10/2014 | Hills et al. | |
| 8,999,056 B1 | 4/2015 | Hills et al. | |
| 9,272,951 B1 | 3/2016 | Hills et al. | |
| 2005/0202989 A1 | * 9/2005 | Wilson | C11D 11/0041 510/245 |
| 2010/0225026 A1 | * 9/2010 | Madsen | B28B 7/384 264/338 |
| 2010/0232253 A1 | * 9/2010 | Lundberg | B08B 9/00 366/68 |
| 2014/0113850 A1 | * 4/2014 | Gayral Chirac | C11D 1/825 510/109 |
| 2014/0220867 A1 | * 8/2014 | Wetherell | B24B 1/00 451/41 |

* cited by examiner

*Primary Examiner* — Joseph J Hail
*Assistant Examiner* — Shantese McDonald
(74) *Attorney, Agent, or Firm* — Durham Jones & Pinegar, P.C., Intellectual Property Law Group

(57) ABSTRACT

A composition for pretreating surfaces of equipment for use with an uncured cementitious material, such as uncured concrete, and/or for cleaning cured cementitious material from the surfaces of such equipment includes an aqueous solution with colloidal silica. Pretreatment of a surface with such an aqueous solution may reduce or eliminate adhesion of uncured cementitious material to the surface. Cured cementitious material may be removed from equipment surfaces by wetting the cured cementitous material with the aqueous solution to chemically soften the cured cementitious material, along with abrading the cured cementitious material to mechanically remove the same from the equipment surfaces. Systems for removing cured cementitious material from the surfaces of equipment configured to use with uncured cementitious material include an abrasive element and an aqueous solution with colloidal silica.

16 Claims, No Drawings

PRE-TREATMENT AND CLEANING OF EQUIPMENT USED WITH UNCURED CEMENTITIOUS MATERIALS

CROSS-REFERENCE TO RELATED APPLICATIONS

A claim for the benefit of priority to the May 8, 2014, filing date of U.S. Provisional Patent Application 61/990,526, titled CONCRETE REMOVAL METHODS AND SYSTEMS (the "526 Provisional Application"), is hereby made pursuant to 35 U.S.C. § 119(e). This application is also a continuation-in-part of U.S. patent application Ser. No. 14/601,198, filed on Jan. 20, 2015 and titled PRE-TREATMENT AND CLEANING OF EQUIPMENT USED WITH UNCURED CEMENTITIOUS MATERIALS ("the '198 application"), now U.S. Pat. No. 10,100,206, issued Oct. 16, 2018, in which a claim for the benefit of priority to the Jan. 20, 2014, filing date of U.S. Provisional Patent Application 61/929,355, titled PRETREATMENT AND CLEANING OF EQUIPMENT USED WITH UNCURED CEMENTITIOUS MATERIALS ("the '355 Provisional Application"), has been made under 35 U.S.C. § 119(e). The entire disclosures of the '355 Provisional Application, the '526 Provisional Application and the '198 application are hereby incorporated herein by reference.

TECHNICAL FIELD

This disclosure relates generally to techniques and systems for pretreating equipment for use in mixing, placing and/or finishing cementitious materials, including, but not limited to, cement, concrete and mortar. More specifically, this disclosure relates to the use of aqueous solutions that include colloidal silica to pretreat surfaces of equipment for mixing, placing and/or finishing cementitious materials to reduce or eliminate the adhesion of cementitious materials to pretreated surfaces. In addition, this disclosure relates to the use of abrasive materials and aqueous solutions that include colloidal silica to clean cured cementitious materials from surfaces of equipment for mixing, placing and/or finishing cementitious materials, such as concrete, mortar or cement.

RELATED ART

Cementitious materials often include two components: (1) paste and (2) aggregates. The paste, which typically includes cement (e.g., Portland cement, etc.) and water, binds the aggregates (e.g., sand, gravel, crushed stone, combinations thereof, etc.) together. As the paste hardens (e.g., due to a chemical hydration reaction between cement and water, etc.) the paste and the aggregate form a rock-like mass.

Because of the high viscosities of uncured, or wet, cementitious materials (e.g., cement, concrete, mortar, etc.), cementitious materials often build up on the surfaces they contact. As a result, equipment that is configured for use with uncured cementitious materials (e.g., cement mixers, forms, finishing tools, etc.) often remains coated with the cementitious materials after use—even when efforts are taken to clean the equipment. The cementitious material that remains on equipment hardens and cures. With repeated use, this residue builds up over time, resulting in relatively thick layers of cured cement, concrete or other cementitious materials on the equipment. Such build-up impairs mixing, performance of the equipment (e.g., discharge performance of a mixing drum, capacity of a mixing drum, etc.). Eventually, the build-up may accumulate and prevent the equipment from functioning properly.

Additionally, previously hardened cementitious materials may break off into fresh, not-yet-hardened cementitious materials, detrimentally affecting their performance. Because of this problem, Department of Transportation (DOT)-certified batch plants must frequently clean and maintain mixing trucks.

Removal of cured cementitious material from equipment typically requires the use of caustic chemicals, such as strong acids, and appropriate measures for disposing of the acidic waste. The strong acids that are typically used to remove concrete, such as hydrochloric acid or muriatic acid, are typically expensive, are not environmentally friendly, are corrosive and can damage surfaces to which they are applied, can be harmful to individuals who are cleaning the equipment and can adversely affect future loads of concrete.

While strong acids may soften the cured concrete, tools (e.g., chisels and hammers or mallets, jackhammers, etc.) are often still needed to mechanically remove the cured concrete from surfaces of the equipment. The use of tools to remove cured concrete can be labor-intensive. Because of the likelihood of flying debris and the dust (which can cause silicosis or even lung cancer) generated by mechanical removal of cementitious materials, the use of tools, as well as the frequent use of strong acids in conjunction with mechanical removal processes, can be dangerous. Accordingly, safety equipment is also frequently needed.

When the cleaning process is complete, the waste materials, which are hazardous, must be properly disposed of, which may increase the expense of the cleaning process.

To avoid these issues, concrete build-up on equipment used with cementitious materials is often manually removed. In order to clean cement mixers, an individual may have to enter the drum of the cement mixer with a chipping hammer or a similar device. The process is tedious, difficult and time-consuming.

DISCLOSURE

A method for pre-treating equipment for use with uncured cementitious material, such as concrete, mortar, cement or the like, includes applying an aqueous solution that includes colloidal silica, amorphous silica or a similar material to a surface of the equipment before uncured concrete comes into contact with the surface. The aqueous solution may include a sufficient concentration of colloidal silica and/or amorphous silica to reduce or eliminate the amount of uncured concrete that sticks or adheres to the surface and, thus, may subsequently have to be removed from the surface of the equipment.

Without limitation, a composition (e.g., an aqueous solution, etc.) for pre-treating equipment that is to be used with uncured cementitious materials may comprise colloidal silica. Various embodiments of aqueous solutions that comprise, consist essentially of and consist of colloidal silica are disclosed in U.S. Pat. No. 8,852,334 ("the '334 patent"), the entire disclosure of which is hereby incorporated herein. Such an aqueous solution may comprise an aqueous solution with silica (i.e., silicon dioxide, or $SiO_2$) particles making up about 2% to about 30% (or, more specifically, about 4% to about 7%) of the weight of the aqueous solution. Stated another way, the silica solids content of such a composition may be about 2% to about 30%.

As an alternative, a composition for pre-treating equipment that is to be used with uncured cementitious materials may comprise amorphous silica. In other alternatives, other materials with properties similar to colloidal silica and/or amorphous silica may be used to pre-treat equipment that is to be used with uncured cementitious materials. More specifically, the composition for pre-treating equipment may be applied to surfaces of the equipment that are to be contacted by a cementitious material (e.g., internal surfaces, external surfaces, both internal and external surfaces, etc.).

In some embodiments, a colloidal silica, an amorphous silica and/or any other suitable material according to or used in accordance with this disclosure may have a particle size (e.g., a diameter, etc.) of about 9 nm to about 300 nm. In some embodiments, the particle sizes may be substantially the same as one another, or they may vary.

In some embodiments, the silica particles may be coated with a stabilizer, such as a metal or a metal-containing material (e.g., aluminum; an aluminum-containing material, such as alumina (i.e., aluminum oxide, or $Al_2O_3$); etc.), which enables the silica particles to remain in solution at relatively low pH (e.g., 10 or less, 8.5 or less, 8 or less, 7 or less, about 3 to about 8, about 4 to about 7, about 3 to about 5, etc.). While the presence of a stabilizer on the silica particles may, in some embodiments, enable the colloidal silica to be used in conjunction with an acid (e.g., hydrochloric acid, muriatic acid, etc.).

The hardener/densifier available from Global Polishing Systems, LLC of Henderson, Nev., as CDH-100 is a specific example of a colloidal silica that may be used in accordance with a pre-treatment process according to this disclosure.

After a composition according to this disclosure has been applied to a surface of equipment configured for use with uncured cementitious materials, the surface may be permitted to dry (i.e., the water may evaporate from it) and, thus, a coating of dried colloidal silica, amorphous silica or the like may remain on and coat the surface before it comes into contact with uncured concrete or another uncured cementitious material. Alternatively, the surface may remain wetted with the composition before the surface contacts the uncured cementitious material.

Without limitation, such an aqueous solution may be applied to a surface of equipment for mixing cementitious materials (e.g., an interior surface of a drum of a cement mixer, etc.), equipment for placing cementitious materials, equipment for finishing cementitious materials (e.g., trowels, blades of power trowels, etc.), or any other equipment that will come into contact with an uncured cementitious material. In a specific embodiment, the aqueous solution may be introduced into a drum of mixing equipment (e.g., a cement mixer, etc.), and the drum may be rotated in a manner that enables the aqueous solution, and the colloidal silica, to coat interior surfaces of the drum. The aqueous solution may be removed before a concrete mix or any other mix for forming a cementitious material is introduced into the drum, or it may remain in place while a mix is introduced into the drum and, thus, form part of the mix. In other embodiments, an aqueous solution that comprises colloidal silica may be applied to a surface of equipment for placing or finishing cementitious materials. Various examples of the manner in which such an aqueous solution may be applied to such a surface include, but are not limited to, spraying the aqueous solution onto the surface, brushing or otherwise wiping the aqueous solution onto the surface and dipping the equipment, or at least the surface(s) that is (are) to be pre-treated, into the aqueous solution, introducing a volume of the aqueous solution into the equipment, and then operating the equipment to enable the aqueous solution to spread onto the surface(s) to which the aqueous solution is to be applied.

Of course, methods for applying non-aqueous compositions according to this disclosure to equipment that will contact uncured cementitious material are also within the scope of this disclosure. Such methods may include the application of non-aqueous compositions, such as powders, etc., to surfaces that may contact uncured concrete.

Equipment may be pre-treated in accordance with teachings of this disclosure when it is new or after it has been cleaned.

In another aspect, techniques and systems for removing cured cementitious material, such as cement, concrete or mortar, from surfaces of equipment include applying an aqueous solution that comprises colloidal silica, amorphous silica or another suitable material to the cured cementitious material. The aqueous composition may penetrate into the cured cementitious material. In some such embodiments, application of the aqueous composition may be accompanied by chemically etching or mechanically abrading the cured cementitious material (e.g., with a chemical etchant, an abrasive element, etc.) while it is wetted with an aqueous form of a composition according to this disclosure.

The aqueous solution may comprise, consist essentially of or consist of colloidal silica, such as the aqueous solutions disclosed by the '334 patent. Such an aqueous solution may comprise an aqueous solution with silica (i.e., silicon dioxide, or $SiO_2$) particles making up about 2% to about 30% (or, more specifically, about 4% to about 7%) of the weight of the aqueous solution. Stated another way, the silica solids content of such a composition may be about 2% to about 30%.

In some embodiments, the silica particles may be coated with a stabilizer, such as a metal or a metal-containing material (e.g., aluminum; an aluminum-containing material, such as alumina (i.e., aluminum oxide, or $Al_2O_3$); etc.), which enables the silica particles to remain in solution at relatively low pH (e.g., 10 or less, 8.5 or less, 8 or less, 7 or less, about 3 to about 8, about 4 to about 7, about 3 to about 5, etc.). While the presence of a stabilizer on the silica particles may, in some embodiments, enable the colloidal silica to be used in conjunction with an acid (e.g., hydrochloric acid, muriatic acid, etc.).

The hardener/densifier available from Global Polishing Systems, LLC of Henderson, Nev. as CDH-100 is a specific example of a colloidal silica that may be used as an aqueous solution to remove cured cementitious material from equipment that is configured for use with an uncured, or wet, cementitious material.

In some embodiments, a suitable aqueous solution may include about 10% colloidal silica, by weight of the aqueous solution, to about 20% colloidal silica, by weight of the aqueous solution. Since colloidal silica is not harmful to the environment, the disclosed pre-treatment and cleaning processes may be carried out without the requirement of special disposal measures (e.g., those required for disposing of strong acids, which are considered to be a hazardous waste, etc.). Further, it has been discovered that the extent to which aqueous solutions comprising colloidal silica soften cured cement and concrete exceeds the extents to which strong hydrochloric acid and muriatic acid soften the same types of cured cementitious material. The selection of an abrasive element to abrade the surface may be based on the surface or the type of equipment from which the cured cementitious material is being removed.

Without limitation, in specific embodiments, the aqueous solution may be pressurized and directed into (e.g., in a spray, a jetted stream, etc.) the cured cementitious material under pressure. In such embodiments, the pressurized aqueous solution may act as the abrasive element.

In other embodiments, a particulate material may be used to abrade cured cementitious material that has been wetted with an aqueous solution that comprises colloidal silica. Some non-limiting examples of particulate abrasive elements include sand, coal slag, metallic slag, mineral abrasives, metallic abrasives, synthetic abrasives and rock. Such abrasive elements may be directed onto the cured cementitious material in any manner that will facilitate removal of the cured cementitious material from the surface without damaging the surface. A particulate abrasive element may be applied under pressure (e.g., by a so-called "blasting" process, etc.). The application of a particulate abrasive element may occur while the aqueous solution is being applied to the cured cementitious material (i.e., simultaneously with application of the aqueous solution). Simultaneous application of the aqueous solution and the abrasive element may include mixing the aqueous solution and the abrasive element and delivering them together (i.e., from a common delivery source), or it may include delivering the aqueous solution and the abrasive element from separate delivery sources. Alternatively, a particulate abrasive element may be used to abrade cured cementitious material that was previously wetted, and remains wetted, with an aqueous solution that comprises colloidal silica.

Under some circumstances, larger abrasive elements may be useful for removing cured cementitious material from surfaces of equipment configured for use with uncured cementitious materials. Such a circumstance may include the removal of cured cementitious material from a surface configured to withstand repeated impact, such as the interior of a drum of equipment for mixing concrete (i.e., a cement mixer). When cured cementitious material builds up on the interior surfaces of a drum of a cement mixer, an aqueous solution that comprises colloidal silica and gravel may be introduced into the interior of the drum. The drum may then be rotated in a direction that keeps the aqueous solution and the gravel in the drum as the colloidal silica and the gravel chemically and mechanically remove the cured cementitious material from interior surfaces of the drum.

As alternatives to the use of a particulate material as an abrasive element to assist in the removal of cured cementitious material from one or more surfaces of equipment configured for use with uncured cementitious materials, a variety of other types of abrasive elements may be used. Some non-limiting examples of abrasive elements that may be used in conjunction with an aqueous solution that comprises colloidal silica to remove cured cementitious material include abrasive pads, abrasive brushes (e.g., wire brushes), grinding elements and the like. These and other types of abrasive elements may be used to assist in the removal of cured cementitious material that has been wetted with the aqueous solution, during and/or after application of the aqueous solution to the cured cementitious material.

In embodiments where teachings of this disclosure are used to remove cured cementitious materials from mixing equipment, it is envisioned that cleaning processes may be effected about once a week (e.g., when cement mixing trucks are parked for the weekend, to minimize any disruption in their use, etc.). Although more frequent cleaning and less frequent cleaning are also within the scope of the disclosed subject matter. Other equipment may be scheduled for cleaning in a similar manner.

Other aspects, as well as features and advantages, of the disclosed subject matter will become apparent to those of ordinary skill in the art through consideration of the disclosure and the appended claims.

Although the foregoing disclosure provides many specifics, these should not be construed as limiting the scope of any of the ensuing claims. Other embodiments may be devised which do not depart from the scopes of the claims. Features from different embodiments may be employed in combination. The scope of each claim is, therefore, indicated and limited only by its plain language and the full scope of available legal equivalents to its elements.

What is claimed:

1. A system for treating equipment for mixing, placing or finishing a cementitious material, comprising:
   a composition comprising a colloidal silica, the composition formulated to enable the colloidal silica to prevent cementitious material from adhering to a surface of the equipment and/or to enable the colloidal silica to soften hardened and/or cured cementitious material to facilitate removal of the hardened and/or cured cementitious material from the surface of the equipment; and
   abrasive particles capable of use with the composition.

2. The system of claim 1, further comprising:
   an abrasion component for forcing the abrasive particles against at least one surface of the equipment to be treated.

3. The system of claim 1, wherein the abrasive particles comprise gravel.

4. A method for pre-treating equipment for mixing, placing or finishing a cementitious material, comprising:
   applying a composition comprising a colloidal silica to a surface of the equipment for mixing, placing or finishing concrete before exposing the surface to wet concrete; and
   with silica remaining on the surface in an amount that prevents concrete from adhering to the surface, exposing the surface to wet concrete.

5. The method of claim 4, wherein applying comprises introducing the composition into a drum of a cement mixer before introducing a mix for the cementitious material into the drum.

6. The method of claim 5, further comprising:
   removing an excess of the composition from the drum before introducing the mix into the drum.

7. The method of claim 5, further comprising:
   leaving an excess of the composition in the drum while introducing the mix into the drum.

8. The method of claim 4, wherein applying comprises applying the composition to a surface of a tool for finishing a structure formed from the cementitious material.

9. A method for removing cementitious material from equipment configured for mixing, placing or finishing the cementitious material, comprising:
   applying a composition comprising a colloidal silica to a surface of the equipment for mixing, placing or finishing cementitious material, including applying the composition to any hardened cementitious material on the surface, an amount of colloidal silica in the composition capable of softening any hardened cementitious material on the surface;
   softening any hardened cementitious material on the surface with the colloidal silica of the composition; and
   after applying the composition to the surface and with silica remaining on the surface, abrading the surface.

10. The method of claim 9, wherein applying the composition comprises introducing the composition into a drum of a cement mixer.

11. The method of claim 9, wherein applying the composition comprises applying the composition to a surface of equipment configured to finish a structure defined by the cementitious material.

12. The method of claim 11, wherein applying the composition comprises applying the composition to a blade of a power trowel.

13. The method of claim 9, wherein applying the composition comprises applying the composition to cured cementitious material on the surface of the equipment.

14. The method of claim 13, wherein applying the composition to the cured cementitious material comprises applying the composition to cured concrete on an interior surface of a drum of a cement mixer.

15. The method of claim 14, wherein abrading the surface comprises introducing gravel into the drum of the cement mixer.

16. The method of claim 13, wherein applying the composition to the cured cementitious material comprises applying the composition to cured concrete on a blade of a power trowel.

\* \* \* \* \*